United States Patent
Koh et al.

(10) Patent No.: US 9,373,848 B2
(45) Date of Patent: Jun. 21, 2016

(54) PASTE FOR FORMING CONDUCTIVE PROTECTION LAYER ON COLLECTOR LAMINATE IN NON-AQUEOUS RECHARGEABLE ELECTRICITY-STORAGE DEVICE

(75) Inventors: Meiten Koh, Settsu (JP); Hideo Sakata, Settsu (JP); Tomoyo Sanagi, Settsu (JP); Hitomi Nakazawa, Settsu (JP); Hiroyuki Arima, Settsu (JP); Toshiki Ichisaka, Settsu (JP); Kenzou Takahashi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/816,356

(22) PCT Filed: Sep. 16, 2011

(86) PCT No.: PCT/JP2011/071265
§ 371 (c)(1),
(2), (4) Date: Feb. 11, 2013

(87) PCT Pub. No.: WO2012/036288
PCT Pub. Date: Mar. 22, 2012

(65) Prior Publication Data
US 2013/0143117 A1 Jun. 6, 2013

(30) Foreign Application Priority Data
Sep. 17, 2010 (JP) .................................. 2010-209598

(51) Int. Cl.
*H01M 4/02* (2006.01)
*H01M 4/66* (2006.01)
(Continued)

(52) U.S. Cl.
CPC ................. *H01M 4/667* (2013.01); *H01B 1/24* (2013.01); *H01G 11/26* (2013.01); *H01G 11/30* (2013.01);
(Continued)

(58) Field of Classification Search
None
See application file for complete search history.

(56) References Cited

U.S. PATENT DOCUMENTS 5,478,676 A * 12/1995 Turi et al. .................... 429/234
6,432,585 B1 * 8/2002 Kawakami et al. .......... 429/233
(Continued)

FOREIGN PATENT DOCUMENTS

JP 10-144298 A 5/1998
JP 10-162833 A 6/1998
(Continued)

OTHER PUBLICATIONS

English Translation of the International Preliminary Report on Patentability and Written Opinion of the International Searching Authority mailed Apr. 16, 2013 for corresponding International Application No. PCT/JP2011/071265.

*Primary Examiner* — Patrick Ryan
*Assistant Examiner* — Jose Colucci Rios
(74) *Attorney, Agent, or Firm* — Sughrue Mion, PLLC

(57) ABSTRACT

The present invention provides a conductive protective layer-forming paste for current collector laminates which can be used even for high voltage designs to protect current collectors from corroding without loss of cell characteristics, and a current collector laminate, an electrode laminate, and non-aqueous secondary cells (e.g. a lithium secondary cell, an electric double layer capacitor) that include a conductive protective layer formed therefrom. The paste for forming conductive protective layers for current collector protection includes: polytetrafluoroethylene; and a conductive filler (b). The current collector laminate includes: a conductive protective layer (A); and a current collector (B), the conductive protective layer (A) being formed by coating the paste for forming conductive protective layers onto the current collector (B).

13 Claims, 1 Drawing Sheet

(51) Int. Cl.
  *H01G 11/30* (2013.01)
  *H01G 11/48* (2013.01)
  *H01M 10/052* (2010.01)
  *H01G 11/26* (2013.01)
  *H01B 1/24* (2006.01)

(52) U.S. Cl.
  CPC .............. *H01G 11/48* (2013.01); *H01M 4/661* (2013.01); *H01M 4/663* (2013.01); *H01M 4/666* (2013.01); *H01M 4/668* (2013.01); *H01M 10/052* (2013.01); *Y02E 60/122* (2013.01); *Y02E 60/13* (2013.01)

(56) References Cited

U.S. PATENT DOCUMENTS

| | | | |
|---|---|---|---|
| 2001/0001590 A1* | 5/2001 | Ishikawa et al. | 361/502 |
| 2004/0151985 A1* | 8/2004 | Munshi | 429/309 |
| 2007/0025062 A1* | 2/2007 | Miyaki et al. | 361/502 |
| 2008/0102370 A1 | 5/2008 | Kashiwagi | |
| 2008/0220330 A1* | 9/2008 | Hosaka et al. | 429/209 |
| 2008/0299457 A1* | 12/2008 | Muraoka et al. | 429/217 |
| 2009/0072448 A1* | 3/2009 | Shi et al. | 264/405 |
| 2009/0296315 A1* | 12/2009 | Eguchi et al. | 361/502 |
| 2009/0325069 A1* | 12/2009 | Anada et al. | 429/217 |

FOREIGN PATENT DOCUMENTS

| | | |
|---|---|---|
| JP | 2002-203562 A | 7/2002 |
| JP | 2006-303381 A | 11/2006 |
| JP | 2006-324288 A | 11/2006 |
| JP | 2008-77993 A | 4/2008 |
| JP | 2008-117574 A | 5/2008 |
| JP | 2010-92664 A | 4/2010 |

* cited by examiner

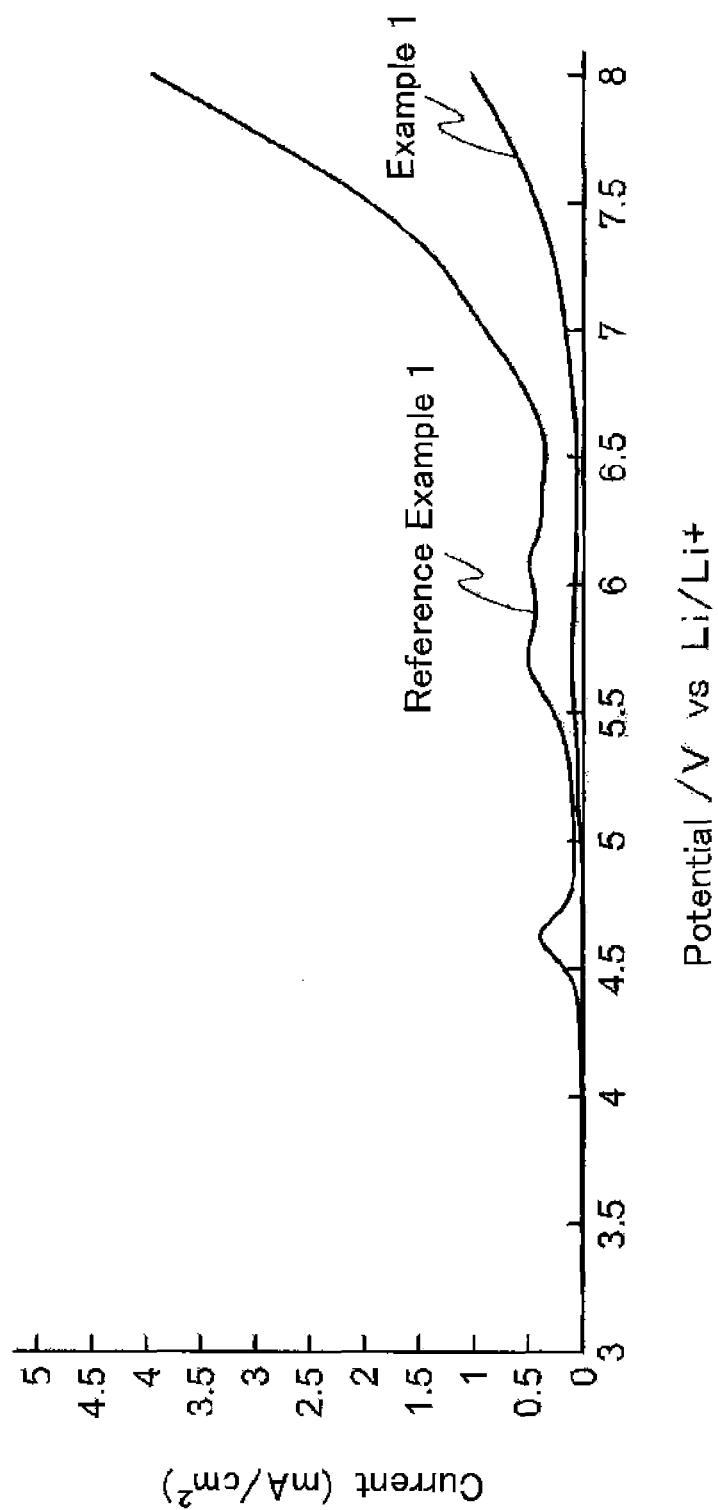

PASTE FOR FORMING CONDUCTIVE PROTECTION LAYER ON COLLECTOR LAMINATE IN NON-AQUEOUS RECHARGEABLE ELECTRICITY-STORAGE DEVICE

CROSS REFERENCE TO RELATED APPLICATIONS

This application is a National Stage of International Application No. PCT/JP2011/071265 filed Sep. 16, 2011, claiming priority based on Japanese Patent Application No. 2010-209598 filed Sep. 17, 2010, the contents of all of which are incorporated herein by reference in their entirety.

TECHNICAL FIELD

The present invention relates to a paste for forming conductive protective layers for nonaqueous secondary cells (e.g. lithium secondary cells) and current collector laminates (e.g. electric double layer capacitors); a current collector laminate and an electrode laminate; and nonaqueous secondary cells including a lithium secondary cell and an electric double layer capacitor.

BACKGROUND ART

A lithium secondary cell includes a positive electrode that includes a positive electrode current collector (e.g. an aluminum foil) and a positive electrode mixture layer containing a positive electrode active material (e.g. a lithium-containing complex oxide) on the positive electrode current collector; a negative electrode that includes a negative electrode current collector (e.g. an aluminum foil) and a negative electrode mixture layer containing a negative electrode active material (e.g. a carbonous material) on the negative electrode current collector; and a nonaqueous electrolytic solution containing an electrolyte salt (e.g. a lithium salt) and an organic solvent.

One disadvantage of this lithium secondary cell structure is that the electrolyte salt (e.g. a lithium salt) in the electrolytic solution anodizes the current collector, and therefore causes corrosion thereof, and in turn, causes the cycle characteristic and capacity of the cell to deteriorate.

Some attempts have been made to prevent or delay the above-described mechanism of current collector corrosion. Described in Patent Literature 1 is formation of a surface protective layer containing a heterocyclic compound on a current collector. Additionally, Patent Literature 2 discloses formation of a protective layer containing at least one selected from noble metals, alloys, conductive ceramics, semiconductors, organic semiconductors, and conductive polymers, on a positive electrode current collector (an aluminum foil) to prevent the current collector from corroding due to a lithium imide salt that is present as an electrolyte salt, and specifically teaches, as conductive polymers, polyaniline, polypyrrole, polyacene, polydisulfide, and polyparaphenylene. One exemplary method for forming a protective layer using a conductive polymer described therein is a method involving casting or coating a mixture solution containing a conductive polymer, a binder, and a dopant (an aromatic sulfonic acid ester) dissolved in a solvent, and heating and drying the coat.

In addition, Patent Literature 3 describes formation of a conductive adhesive layer by spraying a slurry containing carbon black to a current collector (see [0039]).

Patent Literature 4 describes use of an epoxy resin as a binder in a paste for forming current collector protective layers.

CITATION LIST

Patent Literature

Patent Literature 1: JP 10-162833 A
Patent Literature 2: JP 2002-203562 A
Patent Literature 3: JP 2008-117574 A
Patent Literature 4: JP 2006-303381 A

SUMMARY OF INVENTION

Technical Problem

In recent years, because of increasingly stringent requirements for the performance of cells, designs suited for higher voltages (e.g. 4.35 V or higher) have been sought. One important issue of higher voltage designs is protection of their current collectors because the current collectors are more susceptible to corrosion.

As for small-scale, high-capacity lithium secondary cells, most of which are of wound electrode types (wound and spiral types), electrodes with higher flexibility are sought.

In this regard, surface protective layers containing a heterocyclic compound according to Patent Literature 1 are unsatisfactory in terms of ensuring a sufficient oxidation potential, and the materials taught in Patent Literature 2 confer toughness instead of flexibility to electrodes. Additionally, these materials are effective in preventing aluminum foils from corroding due to lithium imide salts but are not effective enough when used in high voltage designs.

Patent Literature 3 teaches use of carbon black but is silent about any binders.

The epoxy resins taught in Patent Literature 4 as binders are not suited for the above-described designs for high voltages (applications in high voltages) because of their low withstand voltage.

An object of the present invention is to provide a conductive layer-forming paste for current collector laminates which can be used even for high voltage designs to protect current collectors from corroding without loss of cell characteristics, and a current collector laminate, an electrode, and nonaqueous secondary cells (e.g. a lithium secondary cell, an electric double layer capacitor) that include a conductive layer formed therefrom.

Solution to Problem

The present invention relates to a paste for forming conductive protective layers for current collector protection which contains polytetrafluoroethylene; and a conductive filler (b).

Preferably, the paste for forming conductive protective layers of the present invention further contains a solvent in addition to the polytetrafluoroethylene and the conductive filler (b) (in this case, the paste is hereinafter also referred to as the conductive protective layer-forming paste (I)).

Preferably, in the conductive protective layer-forming paste (I), the conductive filler (b) is present in an amount of 5 to 1000 parts by mass relative to 100 parts by mass of the PTFE.

Preferably, the paste for forming conductive protective layers of the present invention contains an aqueous dispersion (a) of the polytetrafluoroethylene and the conductive filler (b) (in this case, the paste is hereinafter also referred to as the conductive protective layer-forming paste (II)).

Preferably, in the conductive protective layer-forming paste (II), the conductive filler (b) is present in an amount of 5 to 1000 parts by mass relative to 100 parts by mass of PTFE particles in the PTFE dispersion (a).

The paste for forming conductive protective layers may further contain, as a binder, at least one polymer selected from the group consisting of tetrafluoroethylene-hexafluoropropylene copolymers (FEP), polyamide-imide (PAI), polyimide (PI), polyvinylidene fluoride (PVdF), and tetrafluoroethylene-vinylidene fluoride copolymers.

The conductive filler (b) in the paste for forming conductive protective layers may be a particulate filler, a fibrous filler, or a combination of a particulate filler and a fibrous filler. Preferred is a conductive carbon filler.

The present invention also relates to a current collector laminate that includes: a conductive protective layer (A); and a current collector (B), the conductive protective layer (A) being formed by coating the paste for forming conductive protective layers onto the current collector (B).

The conductive protective layer (A) preferably has a volume resistivity of 0.001 to 50 Ω·cm.

The present invention further relates to an electrode laminate that includes: the current collector laminate of the present invention; and an electrode mixture layer (C) on the conductive layer (A) of the current collector laminate.

The present invention also relates to nonaqueous secondary cells, in particular, a lithium secondary cell and an electric double layer capacitor which include: a positive electrode; a negative electrode; and a nonaqueous electrolytic solution, at least one of the positive electrode and the negative electrode being the electrode laminate of the present invention.

Advantageous Effects of Invention

The paste for forming conductive protective layers of the present invention provides current collector laminates, electrode laminates, and lithium secondary cells of a high voltage design in which current collectors are protected from corrosion without loss of cell characteristics.

BRIEF DESCRIPTION OF DRAWINGS

FIG. 1 is a chart of the results of oxidation potential (CV) measurement of a current collector laminate according to the present invention formed in Example 1.

DESCRIPTION OF EMBODIMENTS

Because of the presence of the PTFE and the conductive filler (b), the paste for forming conductive protective layers of the present invention can protect current collectors from corrosion without loss of cell characteristics even when used in high voltage designs. Advantageously, the paste for forming conductive protective layers provides protective layers that do not impair the flexibility of electrodes.

The following description is offered to illustrate the components.

The PTFE may be a homopolymer of TFE, or a modified PTFE which is modified with only a slight amount of other monomers such as hexafluoropropylene (HFP) and perfluoro (alkylvinylethers) (PAVE). The molecular weight thereof may be in a high molecular weight range that allows fiberization, and may be, for example, about 1,000,000 to about 5,000,000.

The term "modified PTFE" means polymers including polymerization units of other monomers in an amount of less than 1 mol %.

The PTFE is preferably PTFE particles obtained from a PTFE aqueous dispersion. Examples of such PTFE aqueous dispersions include the later-described PTFE aqueous dispersion (a). The average primary particle size of PTFE particles is preferably 0.1 to 0.5 μm. The average primary particle size is measured by light laser scattering.

The paste for forming conductive protective layers of the present invention may further contain other resin(s) as binder (s) in addition to the PTFE. The other resin(s) is/are preferably at least one polymer selected from the group consisting of tetrafluoroethylene (TFE)-hexafluoropropylene (HFP) copolymers (FEP), polyamide-imide (PAI), polyimide (PI), polyvinylidene fluoride (PVdF), and tetrafluoroethylene (TFE)-vinylidene fluoride (VdF) copolymers. Considering adhesion to current collectors, at least one polymer selected from the group consisting of TFE-HFP copolymers (FEP) and TFE-VdF copolymers is more preferable. It should be noted that FEP and TFE-VdF copolymers are copolymers that include polymerization units of monomers other than TFE in an amount of 1 mol % or more.

The amount of other resin(s) is preferably not more than 300 parts by mass, and more preferably not more than 200 parts by mass relative to 100 parts by mass of the PTFE (solids). The lower limit thereof is preferably about 10 parts by mass. The use of these resins provides better adhesion to current collectors.

Additionally, non-fluorine-containing rubbers may be used in combination.

(b) Conductive Filler

The conductive filler (b) used in the present invention is a filler having a volume resistivity of $1 \times 10^{-9}$ to 1 Ω·cm. The volume resistivity is preferably $1 \times 10^{-8}$ to $1 \times 10^{-1}$ Ω·cm.

The conductive filler (b) may be a particulate filler, a fibrous filler, or a combination of a particulate filler and a fibrous filler.

Particularly, the conductive filler (b) is preferably a conductive carbon filler.

Examples of particulate conductive carbon fillers include Ketjen black, acetylene black, nanoporous carbon, graphite (natural graphite, artificial graphite), furnace black, and channel black. Particularly, at least one selected from the group consisting of nanoporous carbon and graphite is preferable in terms of providing good chemical resistance and conductivity and conferring good flowability to the composition, and at least one selected from the group consisting of Ketjen black and acetylene black is preferable in terms of providing good chemical resistance and conductivity. For good conductivity, the average particle size thereof is preferably 0.02 to 50 nm, and more preferably 0.025 to 40 nm. The average particle size of carbon fillers is determined by measuring dispersions of the fillers in an organic solvent by light laser scattering.

Examples of fibrous conductive carbon fillers include carbon fibers, carbon nanotubes, and carbon nanofibers. Particularly, at least one selected from the group consisting of carbon nanotubes and carbon nanofibers is preferable in terms of providing good conductivity, and carbon fibers, in particular, carbon fibers produced by vapor deposition are preferable because of their good cost efficiency. A fibrous carbon with an average fiber diameter of 0.1 to 200 nm is preferable, and one with an average fiber diameter of 1 to 200 nm is more preferable in terms of providing good conductivity. In addition, the average fiber diameter is preferably not more than 50 nm. Its average fiber length to average fiber diameter ratio is preferably not less than 5, and more preferably not less than 10 in terms of ensuring good conductivity. In addition, the ratio is preferably not more than 1000, and more preferably not more than 500 in order to facilitate preparation of the composition.

The conductive filler (b) is preferably at least one filler selected from the group consisting of Ketjen black, acetylene black, nanoporous carbon, graphite, carbon fibers, carbon nanotubes, and carbon nanofibers, among others.

A combination of a particulate carbon filler and a fibrous carbon filler is acceptable. Such a combination further facilitates control of, for example, the ratio of conductivities in perpendicular directions of the later-described protective layer, and further improves the conductivity of the protective layer compared to any single filler. The particulate carbon filler to fibrous carbon filler ratio (mass ratio) is preferably not less than 10/90, and more preferably not less than 20/80 in terms of ensuring good flowability of the composition. The ratio is preferably not more than 90/10, and more preferably not more than 80/20 in order to facilitate control of the ratio of conductivities in perpendicular directions of the later-described protective layer.

In the paste for forming conductive protective layers of the present invention, the conductive filler (b) is present in an amount of preferably 5 to 1000 parts by mass relative to 100 parts by mass of the PTFE. If the amount is less than 5 parts by mass, the protective layer may disadvantageously have insufficient conductivity. On the other hand, if the amount is more than 1000 parts by mass, the preparation of the composition may be disadvantageously difficult. For good stability of the composition in a molding process, the upper limit is more preferably 500 parts by mass, still more preferably 300 parts by mass, and particularly preferably 200 parts by mass. Most preferably, the upper limit is 100 parts by mass in terms of ensuring easy preparation of the paste for forming conductive protective layers.

The paste for forming conductive protective layers of the present invention may contain a combination of a conductive carbon filler and a metal filler. In the case of using a metal filler in combination, the total amount of the conductive filler (b) and the metal filler is preferably 5 to 1000 parts by mass relative to 100 parts by mass of the PTFE. The upper limit is more preferably 500 parts by mass, still more preferably 300 parts by mass, particularly preferably 200 parts by mass, and most preferably 100 parts by mass.

A suitable combination of a conductive carbon filler and a metal filler is appropriately selected based on required performance, and a combination of a particulate carbon filler and particulate and/or fibrous metal filler(s) and a combination of a fibrous carbon filler and particulate and/or fibrous metal filler(s) may be mentioned as examples. The blending ratio thereof is also appropriately determined based on considerations of factors such as the conductivity and weight of the fillers, and the elasticity and flexibility of a conductive layer to be formed.

In addition to the conductive filler (b) or in place of part of the conductive filler (b), a nonconductive filler (having a volume resistivity of higher than 1 Ω·cm) may also be used. Examples of such nonconductive fillers include nonconductive carbon fillers, nonconductive inorganic oxide fillers, and nonconductive resin fillers. Specific examples thereof include nonconductive carbon fillers such as nonconductive carbon black, nonconductive Austin black, nonconductive graphite (natural graphite, artificial graphite), nonconductive carbon nanotubes, and nonconductive graphitized carbon black; nonconductive inorganic oxide fillers such as silica, silicates, clay, diatomaceous earth, montmorillonite, talc, calcium carbonate, calcium silicate, barium sulfate, fatty acid calcium salts, titanium oxide, colcothar, boron nitride, aluminum nitride, magnesium oxide, and alumina; and nonconductive resin fillers such as polyethylene, heat resistant engineering plastics, ethylene-tetrafluoroethylene copolymers (ETFE) comprising tetrafluoroethylene and ethylene and polyvinylidene fluoride (PVdF), which are based on PTFE, fluoropolymers (e.g. polyvinylidene fluoride (PVdF)), and polyimide. The amount thereof is appropriately determined based on considerations of factors such as effects produced by their use, the conductivity and weight of the conductive filler (b), and the elasticity and flexibility of a conductive layer to be formed.

The paste for forming conductive protective layers of the present invention may further contain any of agents such as processing aids and adhesives (silane coupling agents, epoxy resins, phenolic resins) which form crosslinks to cure the composition in amounts that do not impair the object of the present invention.

The paste for forming conductive protective layers of the present invention is preferably a conductive protective layer-forming paste (I), which contains the polytetrafluoroethylene and the conductive filler (b), and further contains a solvent. The solvent is typically water, an organic solvent, or a mixture solvent of water and an organic solvent.

In order to reduce the time and temperature required for drying, the solvent is preferably water or a mixture solvent of water and an organic solvent, and more preferably water.

In order to improve the dispersibility of carbon, the solvent is preferably an organic solvent or a mixture solvent of water and an organic solvent, and more preferably an organic solvent.

The amount of the solvent is determined to give a suitable concentration for coating.

Examples of organic solvents include ketones such as methyl ethyl ketone, acetone, cyclohexanone, dibutyl ketone, and methyl isobutyl ketone; amides such as N-methylpyrrolidone, dimethylacetamide, and dimethylformamide; esters such as butyl acetate, amyl acetate, butyl propionate, ethyl cellosolve, and methyl cellosolve; and polar solvents such as ethers (e.g. tetrahydrofuran, diglyme, triglyme) and aromatic solvents such as toluene and xylene. Any alcohols may be used together.

According to another preferable aspect of the present invention, the paste for forming conductive protective layers of the present invention is a conductive protective layer-forming paste (II), which contains an aqueous dispersion (a) of the polytetrafluoroethylene and the conductive filler (b).

The conductive protective layer-forming paste (II) of the present invention is prepared by adding the conductive filler (b) to the PTFE aqueous dispersion (a). Therefore, the paste contains water as a solvent. Of course, an organic solvent may also be used in order to improve the coatability of the composition. Examples of such organic solvents include those listed for the conductive protective layer-forming paste (I), and specifically include ketones such as methyl ethyl ketone, acetone, cyclohexanone, dibutyl ketone, and methyl isobutyl ketone; amides such as N-methylpyrrolidone, dimethylacetamide, and dimethylformamide; esters such as butyl acetate, amyl acetate, butyl propionate, ethyl cellosolve, and methyl cellosolve; and polar solvents such as ethers (e.g. tetrahydrofuran, diglyme, triglyme) and aromatic solvents such as toluene and xylene. Any alcohols may be used together.

Preferably, the conductive filler (b) is present in an amount of 5 to 1000 parts by mass relative to 100 parts by mass of the polytetrafluoroethylene (solids) in the polytetrafluoroethylene dispersion (a). The upper limit thereof is more preferably 500 parts by mass, still more preferably 300 parts by mass, particularly preferably 200 parts by mass, and most preferably 100 parts by mass.

(a) PTFE Aqueous Dispersion

The PTFE aqueous dispersion (a) is preferably a PTFE aqueous dispersion obtained by emulsion polymerization. In the aqueous dispersion, PTFE particles are preferably present as dispersed primary particles (average particle size 0.1 to 0.5 μm).

The solids content (PTFE particle concentration) of the PTFE aqueous dispersion is preferably about 1 to 80% by mass, and more preferably about 10 to 70% by mass in terms of ensuring good stability of the aqueous dispersion.

The paste for forming conductive protective layers of the present invention can be formed by mixing the components in a common mixing manner.

For example, the paste for forming conductive protective layers of the present invention can be prepared by adding the conductive filler (b) to the PTFE aqueous dispersion (a). Before or after the addition of the conductive filler (b) to the PTFE aqueous dispersion (a), an organic solvent may also be added in order to improve the coatability. In this case, the composition contains a mixture solvent of water and the organic solvent as a solvent.

Alternatively, after phase inversion of the PTFE aqueous dispersion (a) into an organosol in which an organic solvent becomes a continuous phase, the conductive filler (b) may be added to this organosol. In this case, the composition contains an organic solvent or a mixture solvent of water and an organic solvent as a solvent.

The conductive protective layer (A) of the present invention is formed as a part of the current collector laminate by coating the paste for forming conductive protective layers of the present invention onto the current collector (B).

The conductive protective layer (A) formed from the paste for forming conductive protective layers of the present invention serves to protect the current collector, and is preferably a layer between the current collector and an electrode mixture layer (C).

The ratio of the PTFE to the conductive filler (b) in the conductive protective layer (A) is the same as described above for the paste for forming conductive protective layers. The amounts of components other than the PTFE and the conductive filler (b) are also the same as described above for the paste for forming conductive protective layers.

The conductive protective layer (A) can be formed by known methods. For example, the protective layer may be formed by coating the current collector by roller coating, brush coating, dip coating, spray coating, gravure coating, coil coating, curtain flow coating, or the like, and drying the coat in air at ambient temperature or by heating.

The conductive protective layer (A), which is formed in the above-described manner, can be adjusted to a volume resistivity of 0.001 to 50 Ω·cm, and as necessary to 0.001 to 10 Ω·cm or a higher conductivity range of not higher than 1 Ω·cm.

The thickness of the conductive protective layer (A) is appropriately determined in the range of 0.5 to 50 μm, and for example, is preferably not less than 0.5 μm, more preferably not less than 1.0 μm in terms of ensuring low resistance, and is preferably not more than 50 μm, and more preferably not more than 10 μm for formation of an electrode.

The following description is offered to demonstrate the current collector (B).

The present invention is effective especially for materials that are susceptible to corrosion by a lithium salt in an electrolytic solution. Examples of materials for the current collector (B) include aluminum, aluminum alloys, stainless steel, nickel, nickel alloys, titanium, titanium alloys, and aluminum or stainless steel surface-treated with carbon or titanium. Particularly, aluminum and aluminum alloys are mentioned as materials for the current collector (B) to be protected. These materials may be surface-oxidized before use. Additionally, surface treatment to form irregularities on the surface of the current collector (B) is preferable in terms of improving adhesion. The thickness of the current collector (B) is typically 5 to 30 μm.

The current collector laminate of the present invention may be used as a positive electrode or a negative electrode. In particular, it is particularly effective when used as a positive electrode, the current collector of which is more susceptible to corrosion.

The present invention also relates to an electrode laminate that includes the current collector laminate of the present invention and an electrode mixture layer (C) on the conductive protective layer (A) of the current collector laminate.

The electrode mixture layer (C) is formed from an electrode mixture that contains an electrode active material and a binder and optionally contains other compositions. In the present invention, known positive electrode mixtures and negative electrode mixtures can be used, but the present invention is particularly effective when electrode mixtures for high voltage designs are used.

In particular, preferred examples of positive electrode active materials include lithium transition metal complex oxides that generate a high voltage, and specific examples thereof include lithium manganese spinel complex oxides represented by the formula (1): $Li_aMn_{2-b}M^1_bO_4$ ($0.9 \leq a$; $0 \leq b \leq 1.5$; and $M^1$ is at least one metal selected from the group consisting of Fe, Co, Ni, Cu, Zn, Al, Sn, Cr, V, Ti, Mg, Ca, Sr, B, Ga, In, Si and Ge), lithium nickel complex oxides represented by the formula (2): $LiNi_{1-c}M^2_cO_2$ ($0 \leq c \leq 0.5$; and $M^2$ is at least one metal selected from the group consisting of Fe, Co, Mn, Cu, Zn, Al, Sn, Cr, V, Ti, Mg, Ca, Sr, B, Ga, In, Si and Ge), and lithium cobalt complex oxides represented by the formula (3): $LiCo_{1-d}M^3_dO_2$ ($0 \leq d \leq 0.5$; and $M^3$ is at least one metal selected from the group consisting of Fe, Ni, Mn, Cu, Zn, Al, Sn, Cr, V, Ti, Mg, Ca, Sr, B, Ga, In, Si and Ge).

In particular, $LiCoO_2$, $LiMnO_2$, $LiNiO_2$, $LiMn_2O_4$, $LiNi_{0.8}Co_{0.15}Al_{0.05}O_2$, or $LiNi_{1/3}Co_{1/3}Mn_{1/3}O_2$ is preferable in order to produce high-output lithium secondary cells with a high energy density.

Other positive electrode active materials such as $LiFePO_4$, $LiNi_{0.8}CO_{0.2}O_2$, $Li_{1.2}Fe_{0.4}Mn_{0.4}O_2$, $LiNi_{0.5}Mn_{0.5}O_2$, and $LiV_3O_6$ may be used.

In order to ensure a high cell capacity, these positive electrode active materials are used to constitute preferably 50 to 99% by mass, and more preferably 80 to 99% by mass of a positive electrode mixture.

Examples of negative electrode active materials include carbon materials, and metal oxides and metal nitrides into which lithium ions can be doped. Examples of carbon materials include natural graphite, artificial graphite, pyrolytic carbons, cokes, meso carbon microbeads, carbon fibers, activated carbon, and pitch-coated graphite. Examples of metal oxides into which lithium ions can be doped include metal compounds containing tin, silicon or titanium such as tin oxide, silicon oxide, and lithium titanate, and examples of metal nitrides include $Li_{2.6}Co_{0.4}N$.

In order to ensure a high cell capacity, these negative electrode active materials are used to constitute preferably 50 to 99% by mass, and more preferably 80 to 99% by mass of a negative electrode mixture.

Examples of the binder include fluororesins, non-fluorine-containing resins, and rubbers.

Among fluororesins, preferred is at least one polymer selected from the group consisting of PTFE and PVdF. The PTFE may be a homopolymer of tetrafluoroethylene, or a modified PTFE including a slight amount of copolymerized units of hexafluoropropylene (HFP) or perfluoro(alkylvinylethers) (PAVE).

As a non-fluorine-containing resin, polyacrylic acid is mentioned. As rubbers, ethylene-propylene/diene copolymer rubber (EPDM) and styrene-butadiene copolymer rubber (SBR) are mentioned.

The amount of the binder is preferably 0.5 to 15% by mass, and more preferably 0.5 to 10% by mass of the electrode mixture in terms of ensuring a high cell capacity.

Examples of other components include fluororesins for improving adhesion to the electrode mixture or the utilization efficiency of active materials, such as TFE-HFP copolymer resins, ETFE copolymer resins, and VdF copolymer resins; fluororubbers and acrylic rubbers for improving flexibility; cellulose resins for improving withstand voltage such as cellulose acetate; and additives used for production of electrodes for lithium secondary cells, such as conductive materials, thickeners, other polymers, and surfactants. Examples of conductive materials include conductive carbon blacks such as acetylene black and Ketjen black; and carbon materials such as graphite and carbon fibers.

The electrode mixture layer (C) can be formed by preparing a composition for forming an electrode mixture by mixing these components optionally in a suitable solvent into a homogeneous mixture; and coating the composition onto the conductive protective layer (A) of the current collector laminate by methods such as spin coating, blade coating, roll coating, and dip coating.

Typically, after being allowed to dry, the resulting electrode is optionally further rolled, and then cut into a predetermined thickness and size. Thus, a lithium secondary cell is obtained. The rolling and cutting processes may be any of common processes.

Since the current collector is protected from a lithium salt in the electrolytic solution by the protective layer containing the PTFE as a binder, the electrode laminate of the present invention can prevent the current collector from corroding even when exposed to a high working voltage, thereby preventing deterioration of cell characteristics such as a cycle characteristic.

The present invention further relates to a nonaqueous secondary cell, in particular, a lithium secondary cell. The lithium secondary cell of the present invention includes a positive electrode, a negative electrode, and a nonaqueous electrolytic solution, at least one of the positive electrode and the negative electrode being the electrode laminate of the present invention.

In the case that one of the positive electrode and the negative electrode is an electrode other than the electrode of the present invention, it may be a known electrode. Preferably, the positive electrode, which is required to be more flexible, is the electrode of the present invention.

The nonaqueous electrolytic solution is also not particularly limited as long as it is a nonaqueous electrolytic solution for lithium secondary cells which contains an electrolyte salt and an organic solvent capable of dissolving the electrolyte salt.

Examples of the electrolyte include, but are not limited to, known electrolyte salts such as $LiPF_6$, $LiBF_4$, $LiN(SO_2CF_3)_2$, and $LiN(SO_2C_2F_5)_2$. Examples of the organic solvent include hydrocarbon solvents such as ethylene carbonate, dimethyl carbonate, methyl ethyl carbonate, diethyl carbonate, and propylene carbonate; and fluorosolvents such as $HCF_2CF_2CH_2OCF_2CF_2H$, $CF_3COOCF_3$, and $CF_3COOCH_2CF_3$, and mixtures of these solvents.

The lithium secondary cell of the present invention may include a separator. The separator is not particularly limited, and examples thereof include microporous polyethylene films, microporous polypropylene films, microporous ethylene-propylene copolymer films, microporous polypropylene/polyethylene two-layer films, and microporous polypropylene/polyethylene/polypropylene three-layer films. Other examples thereof include films designed to enhance safety by preventing Li dendrites from causing a short circuit, such as a film including an aramid resin-coated separator and a film including a separator coated with a resin containing polyamide imide and an alumina filler (for example, JP 2007-299612 A, JP 2007-324073 A).

The lithium secondary cell of the present invention can be usefully applied to applications such as large-scale lithium secondary cells for hybrid cars and distributed power sources, and small-scale lithium secondary cells for mobile phones and mobile terminal devices.

The present invention further relates to an electric double layer capacitor including the electrode of the present invention. The structure of the electric double layer capacitor is basically the same as conventional ones, except that it includes the electrode of the present invention as an electrode.

EXAMPLES

The following examples further illustrate the present invention and are not to be construed as limiting the present invention.

The following measurement methods and evaluation methods were used in the present invention.
(Measurement of Layer Thickness)
Quick Macro MDQ-30M (Mitsutoyo Corp.) was used for the measurement.
(Measurement of Volume Resistivity)
Loresta-GP (Mitsubishi Chemical Analytech Co., Ltd) was used, and a four-terminal probe was employed for the volume resistivity measurement.
(Measurement of Oxidation Potential)
A current collector laminate was cut into 0.5×0.7 cm, and nickel wires were resistance welded to the cut piece. In this manner, an electrode for CV measurement was prepared. The electrolytic solution used for the measurement was an electrolytic solution prepared by adding $LiPF_6$ (an electrolyte salt) to ethylenecarbonate (EC)/methylethylcarbonate (MEC) (=30/70% by volume) (a solvent capable of dissolving the electrolyte salt) to a concentration of 1.0 mol/litter.

A measurement cell was prepared using a sealed cell for voltammetry (VC-4 available from BAS), the electrode for CV measurement prepared above as a working electrode, and counter and reference electrodes of Li. The cell was filled with 3 ml of the electrolytic solution. The prepared cell was monitored for current changes by scanning at 25° C. (constant) from 3 V to 5.3 V at a rate of 5 mV/sec using a potentiogalvanostat (model 1287 available from SOLARTRON).

Example 1

A PTFE aqueous dispersion (D210C available from Daikin Industries, Ltd.) (a) was adjusted to a solids content of 20% by mass. To 100 g of the resulting PTFE aqueous dispersion were added 50 g of acetylene black (average particle size: 35 nm) as the conductive filler (b) and 2 g of an acrylic resin (A10H) as a thickener, thereby providing a conductive protective layer-forming paste. Subsequently, this paste was uniformly coated onto one surface of a positive electrode current collector (a 15 μm-thick aluminum foil) to form a conductive fluororesin layer (thickness: 5 μm). The layer was then dried at 80° C. in a hot-air dryer for 10 minutes. The paste prepared above was likewise coated onto the other (back) surface and dried, and then the resulting layer was pressed. In this manner, conductive fluororesin layers (total thickness: 10 μm) were formed on the respective surfaces. The laminate was dried at 120° C. in a vacuum drier for 1 hour after reducing the pressure therein to vacuum. As a result, a positive electrode current collector laminate having conductive protective layers on the respective surfaces was formed. The obtained positive electrode current collector laminate was measured for volume resistivity. Table 1 shows the results.

Also, the obtained positive electrode current collector laminate was measured for oxidation potential (CV). FIG. 1 shows the results.

Reference Example

An aluminum foil without conductive protective layers was measured for oxidation potential in the same manner as in Example 1. FIG. 1 shows the results.

In the results shown in FIG. 1, a large peak at around 4.7 V is observed for the native aluminum foil of Reference Example, which suggests that the aluminum foil was oxidized at this voltage, but no large peak is observed until 5.3 V for Example 1 in which the conductive protective layers were formed. These results prove that the aluminum foil was protected from oxidation by the conductive protective layers.

Example 2

A PTFE aqueous dispersion (D210C available from Daikin Industries, Ltd.) (a) and an FEP aqueous dispersion (ND110 available from Daikin Industries, Ltd.) were mixed at a solids ratio (on a mass basis) of 6/4, and the resulting aqueous dispersion was adjusted to a solids content of 20% by mass. To 100 g of the aqueous dispersion thus prepared were added 50 g of acetylene black (average particle size: 35 nm) as the conductive filler (b) and 1 g of carboxymethylcellulose (CMC) as a thickener, thereby providing a conductive protective layer-forming paste. This paste was uniformly coated onto one surface of a positive electrode current collector (a 15 μm-thick aluminum foil) to form a conductive fluororesin layer (thickness: 5 μm). The layer was dried at 80° C. in a hot-air dryer for 10 minutes. The paste prepared above was likewise coated onto the other (back) surface and dried, and then the resulting layer was pressed. Thus, conductive fluororesin layers (total thickness: 10 μm) were formed on the respective surfaces. The laminate was dried at 250° C. in a vacuum drier for 10 hours after reducing the pressure therein to vacuum. In this manner, a positive electrode current collector laminate having conductive protective layers on the respective surfaces was formed. The obtained positive electrode current collector laminate was measured for volume resistivity. Table 1 shows the results.

Example 3

A PTFE aqueous dispersion (D210C available from Daikin Industries, Ltd.) (a) and an FEP aqueous dispersion (ND110 available from Daikin Industries, Ltd.) were mixed at a solids ratio (on a mass basis) of 6/4. After phase inversion in which methyl isobutyl ketone (MIBK) became a continuous phase, the resulting organosol was adjusted to a solids content of 20% by mass. To 100 g of the organosol thus prepared was added 50 g of acetylene black (average particle size: 35 nm) as the conductive filler (b), thereby providing a conductive protective layer-forming paste. This paste was uniformly coated onto one surface of a positive electrode current collector (a 15 μm-thick aluminum foil) to form a conductive fluororesin layer (thickness: 5 μm). The layer was dried at 80° C. in a hot-air dryer for 10 minutes. The paste prepared above was likewise coated onto the other (back) surface and dried, and then the resulting layer was pressed. Thus, conductive fluororesin layers (total thickness: 10 μm) were formed on the respective surfaces. The laminate was dried at 250° C. in a vacuum drier for 10 hours after reducing the pressure therein to vacuum. In this manner, a positive electrode current collector laminate having conductive protective layers on the respective surfaces was formed. The obtained positive electrode current collector laminate was measured for volume resistivity. Table 1 shows the results.

Example 4

A conductive protective layer-forming paste was prepared in the same manner as in Example 2, except that Ketjen black was used instead of acetylene black. This paste was coated onto a positive electrode current collector (a 15 μm-thick aluminum foil) and then dried in the same manner as in Example 2. In this manner, a positive electrode current collector laminate with conductive protective layers on the respective surfaces was prepared. The obtained positive electrode current collector laminate was measured for volume resistivity. Table 1 shows the results.

Example 5

A conductive protective layer-forming paste was prepared in the same manner as in Example 2, except that a carbon fiber produced by vapor deposition (VGCF (registered trademark) available from Showa Denko K. K., average fiber length: 15 μm, average fiber diameter: 150 nm) was used instead of acetylene black. This paste was coated onto a positive electrode current collector (a 15 μm-thick aluminum foil) and then dried in the same manner as in Example 2. In this manner, a positive electrode current collector laminate with conductive protective layers on the respective surfaces was prepared. The obtained positive electrode current collector laminate was measured for volume resistivity. Table 1 shows the results.

Example 6

A conductive protective layer-forming paste was prepared in the same manner as in Example 2, except that the amount of acetylene black was 150 g. This paste was coated onto a positive electrode current collector (a 15 μm-thick aluminum foil) and then dried in the same manner as in Example 2. In this manner, a positive electrode current collector laminate with conductive protective layers on the respective surfaces was prepared. The obtained positive electrode current collector laminate was measured for volume resistivity. Table 1 shows the results.

Example 7

A conductive protective layer-forming paste was prepared in the same manner as in Example 2, except that the amount of acetylene black was 2.5 g. This paste was coated onto a positive electrode current collector (a 15 μm-thick aluminum foil) and then dried in the same manner as in Example 2. In this manner, a positive electrode current collector laminate with conductive protective layers on the respective surfaces was prepared. The obtained positive electrode current collector laminate was measured for volume resistivity. Table 1 shows the results.

Example 8

A PTFE aqueous dispersion (D210C available from Daikin Industries, Ltd.) (a) and a P(TFE-VDF) [TFE-VdF copolymer] aqueous dispersion (VT470 available from Daikin Industries, Ltd.) were mixed at a solids ratio (on a mass basis) of 6/4. After phase inversion in which methyl isobutyl ketone (MIBK) became a continuous phase, the resulting organosol was adjusted to a solids content of 20% by mass. To 100 g of the organosol thus prepared was added 50 g of acetylene black (average particle size: 35 nm) as the conductive filler (b), thereby providing a conductive protective layer-forming paste. This paste was uniformly coated onto one surface of a positive electrode current collector (a 15 μm-thick aluminum foil) to form a conductive fluororesin layer (thickness: 5 μm). The layer was dried at 80° C. in a hot-air dryer for 10 minutes. The paste prepared above was likewise coated onto the other (back) surface and dried, and then the resulting layer was pressed. Thus, conductive fluororesin layers (total thickness: 10 μm) were formed on the respective surfaces. The laminate was dried at 250° C. in a vacuum drier for 10 hours after reducing the pressure therein to vacuum. In this manner, a positive electrode current collector laminate having conductive protective layers on the respective surfaces was formed. The obtained positive electrode current collector laminate was measured for volume resistivity. Table 1 shows the results.

Example 9

A PTFE aqueous dispersion (D210C available from Daikin Industries, Ltd.) (a) and a P(TFE-VDF) aqueous dispersion (VT470 available from Daikin Industries, Ltd.) were mixed at a solids ratio (on a mass basis) of 8/2. After phase inversion in which N-methylpyrrolidone (NMP) became a continuous phase, the resulting organosol was adjusted to a solids content of 20% by mass. To 100 g of the organosol thus prepared was added 50 g of acetylene black (average particle size: 35 nm) as the conductive filler (b), thereby providing a conductive protective layer-forming paste. This paste was uniformly coated onto one surface of a positive electrode current collector (a 15 μm-thick aluminum foil) to form a conductive fluororesin layer (thickness: 5 μm). The layer was dried at 80° C. in a hot-air dryer for 10 minutes. The paste prepared above was likewise coated onto the other (back) surface and dried, and then the resulting layer was pressed. Thus, conductive fluororesin layers (total thickness: 10 μm) were formed on the respective surfaces. The laminate was dried at 250° C. in a vacuum drier for 10 hours after reducing the pressure therein to vacuum. In this manner, a positive electrode current collector laminate having conductive protective layers on the respective surfaces was formed. The obtained positive electrode current collector laminate was measured for volume resistivity. Table 1 shows the results.

Table 1 demonstrates that all the conductive protective layers of the current collector laminates were highly conductive protective layers with a resistivity of not more than 50 Ω·cm.

Example 10

A positive electrode active material was prepared by mixing $LiNi_{1/3}Mn_{1/3}Co_{1/3}O_2$, carbon black, and polyvinylidene fluoride (trade name: KF-1000, available from Kureha Corp.) at a ratio of 90/3/7 (on a % by mass basis), and a positive electrode mixture slurry was prepared by dispersing and slurrying the positive electrode active material in N-methyl-2-pyrrolidone. This slurry was uniformly coated onto the positive electrode current collector laminate of the present invention prepared in Example 1, and then dried. The positive electrode mixture layer (thickness: 50 μm) thus formed was press-molded by a roller press machine. In this manner, a positive electrode laminate was prepared.

A lithium secondary coin cell was produced from the obtained positive electrode laminate by following the procedures described below. This cell was measured for discharge capacity and cycle characteristic. Table 2 shows the results.

(Production of Coin Cell)

A round positive electrode with a diameter of 1.6 mm was punched out from the positive electrode laminate.

Separately, a dispersion of styrene-butadiene rubber in distilled water was combined with artificial graphite powder (trade name: MAG-D, available from Hitachi Chemical Co., Ltd.) to give a mixture containing 6% by mass of styrene-butadiene rubber solids, and this mixture was stirred with a disperser into a slurry. This slurry was uniformly coated onto a negative electrode current collector (a 10 μm-thick copper foil) and dried to form a negative electrode mixture layer. Then, the laminate was press-molded by a roller press machine and a round negative electrode with a diameter of 1.6 mm was punched out from the laminate.

The positive electrode was positioned in parallel with the negative electrode with a 20 μm-thick microporous polyethylene film (separator) therebetween, and an electrolytic solution (an electrolytic solution prepared by adding $LiPF_6$ to a solvent capable of dissolving the electrolyte salt (EC/MEC=30/70% by volume) to a concentration of 1.0 mol/litter) was added to a cell. After the electrolytic solution was allowed to penetrate the separator and other components sufficiently, the cell was sealed, and preliminary charging and aging were performed. In this manner, a lithium secondary coin cell was prepared.

TABLE 1

| | Example | | | | | | | | |
|---|---|---|---|---|---|---|---|---|---|
| Paste composition (g in total solids) | 1 | 2 | 3 | 4 | 5 | 6 | 7 | 8 | 9 |
| PTFE | 20 | 12 | 12 | 12 | 12 | 12 | 12 | 12 | 12 |
| FEP | — | 8 | 8 | 8 | 8 | 8 | 8 | — | — |
| P (TEF/VDF) | — | — | — | — | — | — | — | 8 | 8 |
| Acetylene black | 50 | 50 | 50 | — | — | 150 | 2.5 | 50 | 50 |
| Ketjen black | — | — | — | 50 | — | — | — | — | — |
| Carbon fiber produced by vapor deposition | — | — | — | — | 50 | — | — | — | — |
| Solvent | Water | Water | MIBK | Water | Water | Water | Water | MIBK | NMP |
| Volume resistivity ($10^{-2}$ Ω·cm) | 6 | 8 | 8 | 2 | 8 | 10 | 3 | 8 | 8 |

(Measurement of Cell Characteristics)

The lithium secondary coin cell was analyzed for discharge capacity and cycle characteristic by following procedures described below.

(Discharge Capacity)

Charge and discharge currents are represented by a unit C, and 1 C is defined herein as 5 mA. Measurement was performed under the following charge and discharge measuring conditions. The result is expressed as an index relative to the discharge capacity of Comparative Example 1 which is defined as 100.

Charge and Discharge Conditions

Charging: Charging was continued at 1.0 C at 4.7 V until the charge current reached $\frac{1}{10}$ C (CC·CV charging).

Discharging: 1 C, 3.0 Vcut (CC discharging)

(Cycle Characteristic)

In the cycle characteristic evaluation, a charging and discharging cycle under the above charge and discharge conditions (charging was continued at 1.0 C at 4.7 V until the charge current reached $\frac{1}{10}$ C, and discharging was continued to 3.0 V at a current corresponding to 1 C) was regarded as one cycle, and the discharge capacity was measured after the first five cycles and 100 cycles. The cycle characteristic was defined as a cycle maintenance factor determined from the following equation:

Cycle maintenance factor (%)=(discharge capacity (mAh) after 100 cycles/discharge capacity (mAh) after five cycles)×100.

Example 11

A positive electrode laminate and a lithium secondary coin cell were produced in the same manner as in Example 10, except that the positive electrode current collector of Example 2 was used. The cell characteristics (discharge capacity, cycle characteristic) were also analyzed in the same manner as in Example 10. Table 2 shows the results.

Example 12

A positive electrode laminate and a lithium secondary coin cell were produced in the same manner as in Example 10, except that the positive electrode current collector of Example 4 was used. The cell characteristics (discharge capacity, cycle characteristic) were also analyzed in the same manner as in Example 10. Table 2 shows the results.

Example 13

A positive electrode laminate and a lithium secondary coin cell were produced in the same manner as in Example 10, except that the positive electrode current collector of Example 5 was used. The cell characteristics (discharge capacity, cycle characteristic) were also analyzed in the same manner as in Example 10. Table 2 shows the results.

Example 14

A positive electrode laminate and a lithium secondary coin cell were produced in the same manner as in Example 10, except that the positive electrode current collector of Example 6 was used. The cell characteristics (discharge capacity, cycle characteristic) were also analyzed in the same manner as in Example 10. Table 2 shows the results.

Example 15

A positive electrode laminate and a lithium secondary coin cell were produced in the same manner as in Example 10, except that the positive electrode current collector of Example 7 was used. The cell characteristics (discharge capacity, cycle characteristic) were also analyzed in the same manner as in Example 10. Table 2 shows the results.

Comparative Example 1

A positive electrode laminate and a lithium secondary coin cell were produced in the same manner as in Example 10, except that an aluminum foil without conductive protective layers was used. The cell characteristics (discharge capacity, cycle characteristic) were also analyzed in the same manner as in Example 10.

Comparative Example 2

1,2,4-Triazole was dissolved in a mixture solvent of ethylenecarbonate/dimethoxyethane (50/50% by volume) to a concentration of 0.03 mol·dm$^{-3}$. The positive electrode laminate prepared in Comparative Example 1 was immersed in this solution, and then taken out. From this positive electrode laminate, a lithium secondary coin cell was produced in the same manner as in Example 10. This cell was analyzed for cell characteristics (discharge capacity, cycle characteristic) in the same manner as in Example 10. Table 2 shows the results.

Comparative Example 3

Polyparaphenylene protective layers with a thickness of 10 µm were formed by low-temperature firing on the respective surfaces of an aluminum foil current collector. The positive electrode mixture slurry of Example 10 was coated onto this aluminum foil current collector with protective layers, and a lithium secondary coin cell was produced in the same manner as in Example 10. This cell was analyzed for cell characteristics (discharge capacity, cycle characteristic) in the same manner as in Example 10. Table 2 shows the results.

TABLE 2

| | Example | | | | | | Comparative Example | | |
|---|---|---|---|---|---|---|---|---|---|
| | 10 | 11 | 12 | 13 | 14 | 15 | 1 | 2 | 3 |
| Positive electrode current collector Cell characteristics | Example 1 | Example 2 | Example 4 | Example 5 | Example 6 | Example 7 | No conductive protective layer | Formed by immersion | Polyparaphenylene protective layers |
| Discharge capacity (index) | 101.2 | 102.5 | 101.1 | 99.5 | 100.1 | 102.3 | 100.0 | 86.2 | 80.3 |
| Cycle characteristic | 90.5 | 90.2 | 91.2 | 89.2 | 89.6 | 91.2 | 84.3 | 62.1 | 88.1 | except that the positive electrode current collector of Example 5 was used. The cell characteristics (discharge Table 2 demonstrates that the cells of the examples had a discharge capacity equivalent to or higher than those of the comparative examples even when charged and discharged at 4.7 V, and also had an improved cycle characteristic. These results revealed that by forming conductive protective layers according to the present invention on an aluminum foil, the current collector can be protected from oxidative corrosion.

The invention claimed is:

1. A paste for forming conductive protective layers for current collector protection, comprising:
   polytetrafluoroethylene;
   a conductive filler (b);
   a solvent; and
   at least one polymer selected from the group consisting of tetrafluoroethylene-hexafluoropropylene copolymers, polyamide-imide, polyimide, polyvinylidene fluoride, and tetrafluoroethylene-vinylidene fluoride copolymers.

2. The paste for forming conductive protective layers according to claim 1,
   wherein the conductive filler (b) is a particulate filler, a fibrous filler, or a combination of a particulate filler and a fibrous filler.

3. The paste for forming conductive protective layers according to claim 1,
   wherein the conductive filler (b) is a conductive carbon filler.

4. The paste for forming conductive protective layers according to claim 1,
   wherein the conductive filler (b) is present in an amount of 5 to 1000 parts by mass relative to 100 parts by mass of the polytetrafluoroethylene.

5. A paste for forming conductive protective layers for current collector protection, comprising:
   an aqueous dispersion (a) of polytetrafluoroethylene;
   a conductive filler (b); and
   at least one polymer selected from the group consisting of tetrafluoroethylene-hexafluoropropylene copolymers, polyamide-imide, polyimide, polyvinylidene fluoride, and tetrafluoroethylene-vinylidene fluoride copolymers.

6. The paste for forming conductive protective layers according to claim 5,
   wherein the conductive filler (b) is a particulate filler, a fibrous filler, or a combination of a particulate filler and a fibrous filler.

7. The paste for forming conductive protective layers according to claim 5,
   wherein the conductive filler (b) is a conductive carbon filler.

8. The paste for forming conductive protective layers according to claim 5,
   wherein the conductive filler (b) is present in an amount of 5 to 1000 parts by mass relative to 100 parts by mass of polytetrafluoroethylene solids in the polytetrafluoroethylene dispersion (a).

9. A current collector laminate comprising:
   a conductive protective layer (A); and
   a current collector (B),
   the conductive protective layer (A) being formed by coating the paste for forming conductive protective layers according onto claim 1 on the current collector (B).

10. The current collector laminate according to claim 9,
    wherein the conductive protective layer (A) has a volume resistivity of 0.001 to 50 Ω·cm.

11. An electrode laminate comprising:
    the current collector laminate according to claim 9; and
    an electrode mixture layer (C) on the conductive layer (A) of the current collector laminate.

12. A lithium secondary cell comprising:
    a positive electrode;
    a negative electrode; and
    a nonaqueous electrolytic solution,
    at least one of the positive electrode and the negative electrode being the electrode laminate according to claim 11.

13. An electric double layer capacitor comprising:
    a positive electrode;
    a negative electrode; and
    a nonaqueous electrolytic solution,
    at least one of the positive electrode and the negative electrode being the electrode laminate according to claim 11.

* * * * *